June 2, 1964

J. THEVENAZ 3,135,157

CINEMATOGRAPHIC PROJECTOR

Filed Feb. 23, 1961

5 Sheets-Sheet 1

INVENTOR
JEAN THEVENAZ
By Emory L. Groff Jr.
Atty

June 2, 1964 J. THEVENAZ 3,135,157
CINEMATOGRAPHIC PROJECTOR
Filed Feb. 23, 1961 5 Sheets-Sheet 2

INVENTOR
JEAN THEVENAZ
BY Emery L. Groff
Atty

INVENTOR
JEAN THEVENAZ

June 2, 1964  J. THEVENAZ  3,135,157
CINEMATOGRAPHIC PROJECTOR

Filed Feb. 23, 1961  5 Sheets-Sheet 4

INVENTOR
JEAN THEVENAZ
By Emery L. Groff Jr.
Atty

June 2, 1964  J. THEVENAZ  3,135,157
CINEMATOGRAPHIC PROJECTOR
Filed Feb. 23, 1961  5 Sheets-Sheet 5

INVENTOR
JEAN THEVENAZ
By Emory L. Groff Jr.
Atty

United States Patent Office 3,135,157
Patented June 2, 1964

3,135,157
CINEMATOGRAPHIC PROJECTOR
Jean Thevenaz, Grandson, Vaud, Switzerland, assignor to Paillard S.A., Sainte-Croix, Vaud, Switzerland, a corporation of Switzerland
Filed Feb. 23, 1961, Ser. No. 91,213
Claims priority, application Switzerland Mar. 2, 1960
1 Claim. (Cl. 88—17)

Many cinematographic projectors are provided with means for stopping the action of the film in order to allow the observation of a definite image thereof. Cinematographic films do not withstand the intense heat of the normal luminous projection beam, and if no special means were provided, the part of the film which has been stopped and which is in the luminous beam would be brought to the melting temperature of the cellulose acetate support with in a few seconds. For this reason, means are included in the form of a screen or filter, which is disposed between the luminous source and the film for absorbing the greater part of the luminous flux. There results a very substantial reduction of luminosity of the projected image, so that it is difficult to observe details of the same. In spite of these precautions, the heat is still so intense that it distorts the stationary film in the film gate and obliges the operator constantly to change the focus of the objective lens.

The present invention intends to eliminate this disadvantage. Accordingly, one of the objects of this invention is to provide a cinematographic projector, adapted to be driven at at least two different speeds by an electric motor, comprising a shutter with a variable number of blades, characterized in that at least a certain number of the blades of the shutter are withdrawable, the number of withdrawable blades being at least as great as that of the blades necessary for projection at normal speed, means being provided to drive the projector at a slow speed at least twice as low as the normal speed and to increase the number of shutter blades in operation in order to avoid flicker.

The accompanying drawing shows, diagrammatically and by way of example, one embodiment of a projector according to the invention.

Figure 1:
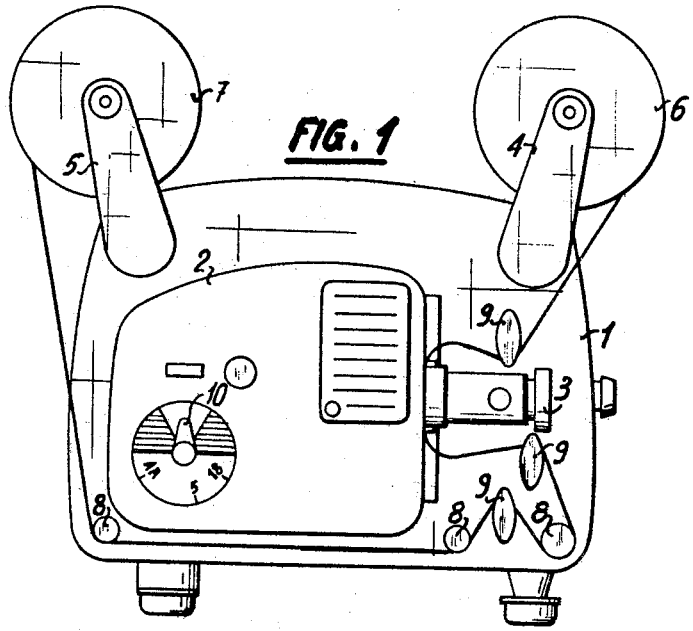
Figure 4:
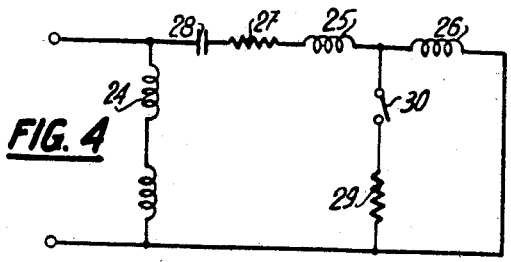
Figure 5:
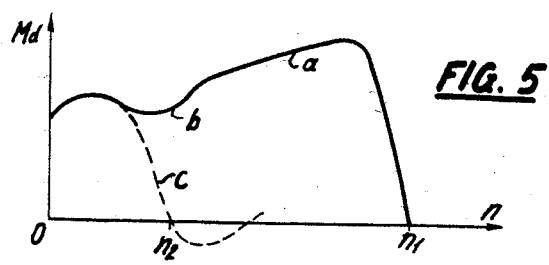
Figure 2:
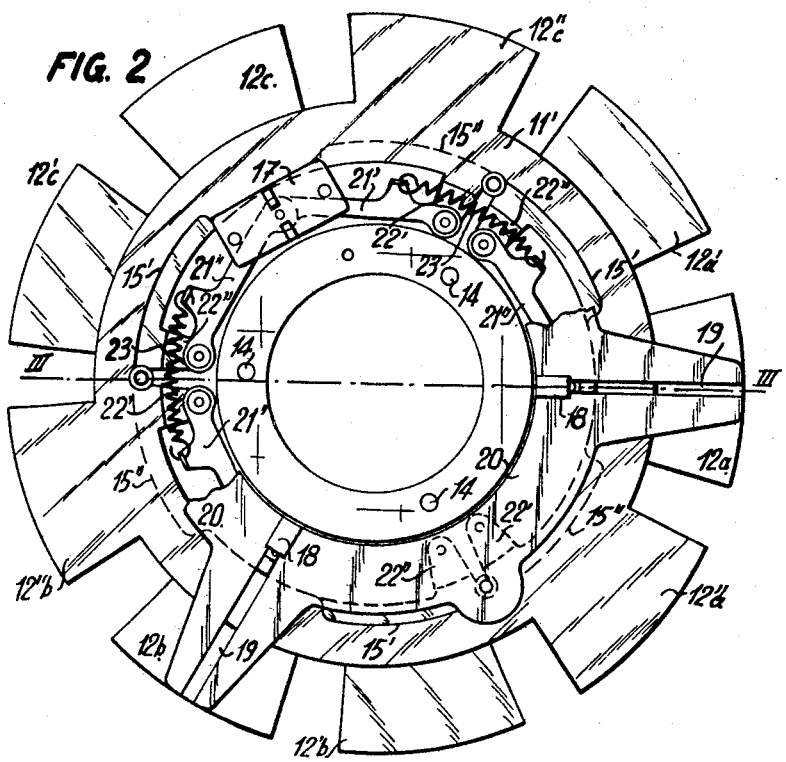
Figure 3:
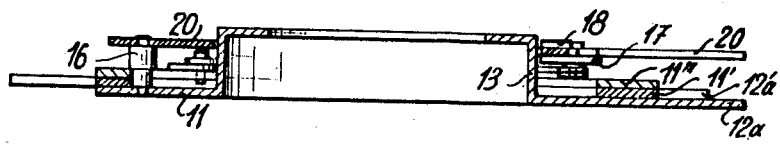
Figure 6:
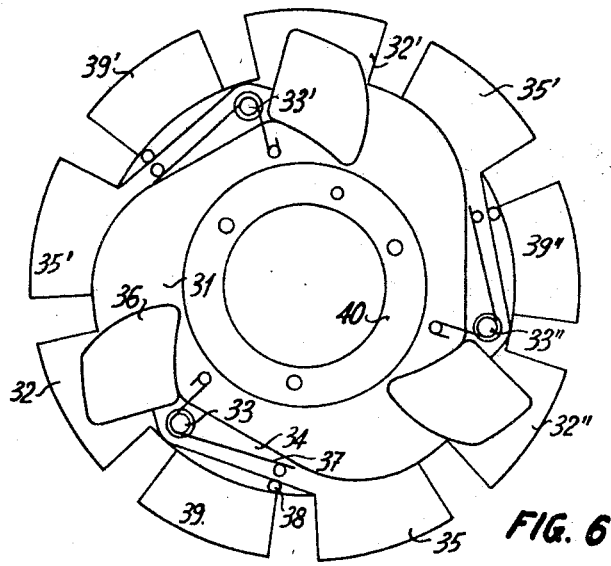
Figure 7:
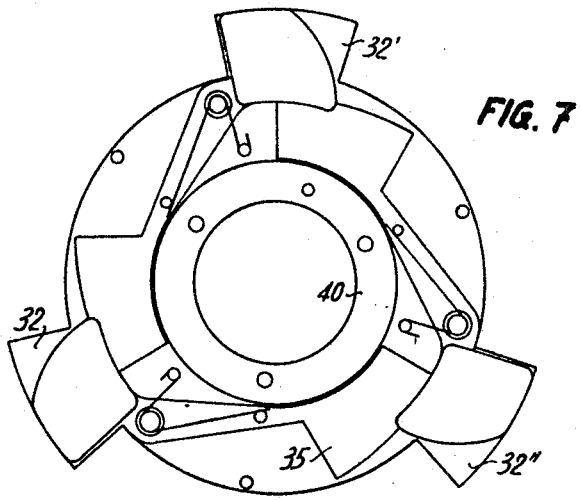
Figure 8:
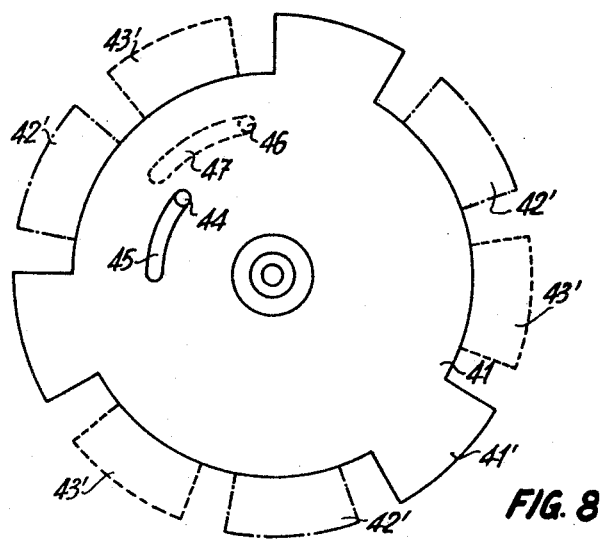
Figure 9:
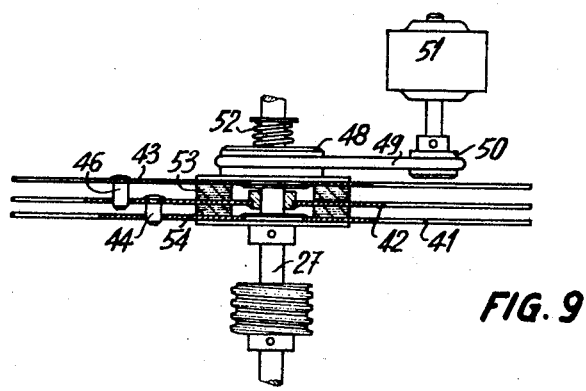
Figure 10:
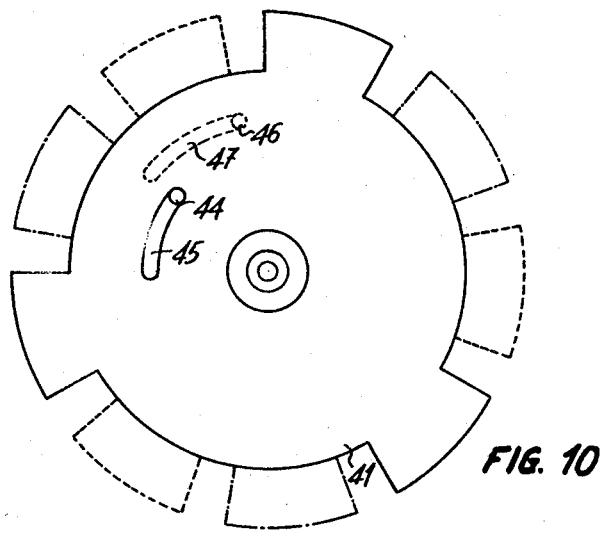
Figure 11:
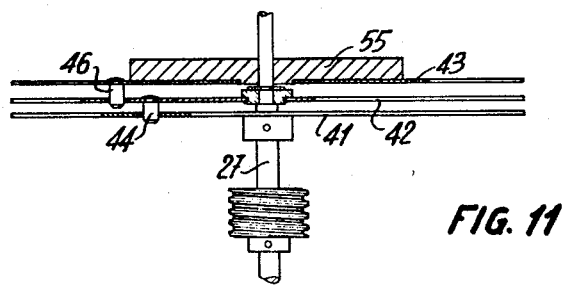

FIG. 1 is a general view of this projector.
FIG. 2 is a view of the shutter with which this projector is equipped, with parts being broken away.
FIG. 3 is a section along line III—III of FIG. 2.
FIG. 4 is a wiring diagram of the projector motor.
FIG. 5 is a diagram showing the couple of this motor in terms of its speed of rotation.
FIG. 6 is an elevation view of another modification of the invention showing the movable blades in operative position with the fixed blades.
FIG. 7 is another view of the shutter of FIG. 6 showing only the fixed blades in operative position.
FIG. 8 is an elevation view of a further modification of the invention showing the two sets of movable blades in broken lines.
FIG. 9 is a top plan view, partly in section, of the shutter of FIG. 8.
FIG. 10 is an elevation view of a modified shutter.
FIG. 11 is a top plane view, partly in section, of the shutter shown in FIG. 10.

The projector shown in FIG. 1 comprises a frame 1 supporting a motor (not shown), a luminous source comprising a low voltage lamp housed in a part 2 of the frame, this part further supporting an objective lens 3. The frame 1 carries two arms 4 and 5 for the delivery and take-up spools 6 and 7, as well as rollers 8 and sprocket wheels 9 for feeding the film.

On the part 2 is provided a control knob 10 operating a change-over switch controlling the driving motor. The knob 10 is shown in the drawing in the at rest position. When the knob 10 is turned clockwise, it is first brought opposite a dark-coloured sector in which the motor is driven forwardly, but the lamp is not switched on. By continuing to turn the knob, it is brought successively opposite two positions indicated by 18 and 5, for which the driving speed of the film is respectively 18 and 5 frames per second, the lamp being switched on. By turning the knob 10 in a counterclockwise direction from the position shown in the drawing, the motor is first driven in a reverse direction with the lamp switched off, then, for the position indicated by AR, the projection lamp is also switched on.

When the projector is employed at the speed of 5 frames per second, very slow motion is obtained which allows the viewing of a scene just as well as if the film were stopped on a particular image. In order to avoid flicker, it is necessary to provide a greater number of interceptions for one revolution of the shutter than for the normal speed. It is in fact known that flicker disappears when the frequency of the interceptions is equal to at least 40 per second.

FIGS. 2 and 3 show a shutter permitting 9 interceptions per revolution when the driving speed is 5 frames per second, and only 3 interceptions for the normal projection speed, which has been fixed, for this projector, at 18 frames per second.

This shutter comprises a disk 11 provided on its periphery with three blades 12a, 12b and 12c. The inner parts of this disk 11 is stamped to form a cylindrical projection 13. Holes 14 permit fixing the disk 11 on its driving support (not shown). The shutter further comprises two other disks 11' and 11" which are each provided with three blades on its periphery. These blades are respectively designated by 12'a, 12'b, 12'c and 12"a, 12"b, 12"c.

The disks 11' and 11" are of annular shape and each of their inner edges is provided with three parts 15', 15" in the shape of an arc of a circle centered relative to the disks and adapted to bear against three projections 16 offset by 120° and rivetted to the disk. The disks 11' and 11" may therefore rotate concentrically with the disk 11 through an angle corresponding to the arc covered by the parts 15' and 15" respectively. This angle is sufficient for a rotation in a reserve direction of the disks 11' and 11" to be able to place the blades 12'a and 12"a behind the blade 12a of the disk 11. Similarly, the blades 12'b, 12"b and 12'c, 12"c are then respectively located behind the blades 12b and 12c of the disk 11, so that the shutter then only presents three operative blades.

The movement of the disks 11' and 11" is controlled by centrifugal force by means of three inertia heads 17 each provided with a part 18 engaged in a slot 19 of a disk 20 of annular shape which is fixed to the disk 11 by means of the three projections 16. Each inertia head 17 drives two arms 21' and 21" which are hinged on the latter at one of their ends, their other end being hinged to a lug 22', 22" on the disks 11' and 11". The arrangement of the inertia heads 17 is symmetrical, so that there are three arms 21' and three arms 21". Three draw-springs 23 are each hooked on two arms 21' and 21" so that their action urges the disks 11' and 11" in the position shown in the drawing, in which the shutter will be seen to comprise nine operative blades.

The tension of the springs 23 is such that when the shutter effects 5 revolutions per second, these springs hold the inertia heads 17 in the position shown in the drawing; however, when the speed of rotation is 18 revolutions per second, the centrifugal force is greater than that exerted by the springs, so that the inertia heads 17 slide radially in the slots 19 and bring about, through the agency of the arms 21′ and 21″, opposite rotations of the disks 11′ and 11″, the blades of which come behind those of the stationary disk 11.

In the embodiment shown of the shutter, each blade has a width corresponding to an arc of 30°. The nine blades thus cover a total arc of 270°, so that the effective luminous flux is equal to 25% of the total luminous flux. When the speed is 18 frames per second, the shutter has three operative blades and the flux passing between the blades is equal to 75% of the total flux. It will be seen that for the slow speed of 5 frames per second, the luminosity is three times less than the luminosity during normal operation. This reduction is thus less important than that which would be apparent in the case of projectors provided with means for stopping the film movement on an image.

It is obvious that the operative movement of the film feeding claw, which is not shown, must be very quick and shorter than a rotation of 30° of the shutter. It is evident that the quicker the movement of the claw, the narrower may be the blades of the shutter, thereby permitting an increase in the luminosity of the projector.

The drive of the projector is ensured by an asynchronous motor, which is not visible in FIG. 1, and of which the wiring diagram is shown in FIG. 4. This motor comprises a main energizing winding 24 and a starting winding comprising two partial windings 25 and 26 and connected to the terminals of the main winding 24 through a resistance 27 and a condenser 28. The partial winding 26 of the starting winding may be shunted by a resistance 29 by means of a switch 30.

FIG. 5 shows the torque $Md$ of such a motor in terms of its rotational speed $n$. The curve $a$ in full lines shows the characteristic of the motor when the switch 30 is open. It will be seen that the torque is at its maximum for a rotational speed slightly lower than the speed of synchronism $n_1$, for which the torque is zero. The rising part of the curve $a$ shows a depression $b$ which may be obtained in different known manners. When the switch 30 is closed, the characteristic of the motor is transformed as indicated by the curve $c$ for which the torque becomes zero for a speed $n_2$ which is included between the fifth and the third of $n_1$.

The foregoing illustrates a very simple means of obtaining the dead slow speed of the projector of 5 frames per second, since it suffices to control the switch 30 by means of the knob 10. However, it is obvious that other means might be provided to obtain the dead slow speed, which may advantageously be less than 6 frames per second. Thus, the driving motor could be of the commutable pole type, or a collector, and its speed could be adjusted, in the usual manner, by means of a variable resistor connected in series with the secondary circuit of the motor. The slow speed could also be higher than in the example described, but in order to obtain interesting results, it must be at the most equal to half and preferably lower than a third of the normal speed of projection. When the slow speed approaches normal half-speed, there may be provided a shutter of which the number of withdrawable blades is equal to the number of stationary blades necessary for projection at normal speed. In any case, it is desirable that each blade extend over an arc of less than 35°, which implies that the duration of the operative movement of the feeding claw must be less than the duration of a rotation through 35° of the shutter.

FIGS. 6 and 7 show a modified embodiment of a shutter in which the number of blades in operation is changed by centrifugal force. This shutter comprises a disk 31 on the periphery of which are cut out three stationary blades 32, 32′ and 32″. This disk 31, carries, on one of its faces, three projections 33, 33′, 33″ on each of which pivots an arm 34 one end of which carries a blade 35 and the other an inertia head 36. Each arm is subjected to the action of a spring 37 holding it in the position shown in FIG. 6, in which position the blade 35 is operative. It will be seen that the movement of the latter outwardly is limited by a projection 38 fixed in the disk 31 and constituting an abutment for the said arm.

On the other face of the disk 31, which is not shown in the drawing, a similar arrangement permits the setting in operative position and withdrawing of the three other blades 39, 39′ and 39″.

The strength of the springs 37 is sufficient to hold the blades 35 and 39 in their operative position for slow speed projection. When the speed of projection is increased to reach normal speed, the force acting on the inertia heads becomes preponderant and brings about the pivoting of the arms 34 so as to cause them to occupy the position shown in FIG. 7, in which position all the movable blades are withdrawn, while the inertia heads come behind the three stationary blades 32, 32′ and 32″. The pivoting of the arms 34, under the action of the centrifugal force, is limited by a hub 40 against which abuts the inner edge of the blades 35 and 39. When the speed of rotation of the shutter falls again below a determined speed, the action of the springs 37 is stronger than that of the centrifugal force and the blades take up again their position shown in FIG. 6.

FIGS. 8 and 9 show another embodiment of a shutter which is kinetically connected to a slow and quick speed control device, that is to say a shutter of which the number of operative blades is controlled solely by its speed of rotation or by a variation in the latter, without any mechanical control device directly acting on a control device for the number of operative blades.

The shutter shown in FIGS. 8 and 9 comprises three disks 41, 42 and 43 each provided with three peripheral blades 41′, 42′ and 43′ respectively. In order more readily to understand the drawing, the blades 42′ have been shown in dot and dash lines in FIG. 8, and the blades 43′ in dotted lines.

The disk 41 is fixed to the shaft 27, while the disks 42 and 43 may rotate on this shaft. However, the rotation of the disk 42 relative to the disk 41 is limited by the engagement of a projection 44 on the disk 42 in an arcuate slot 45 in the disk 41. Similarly, the rotation of the disk 43 is limited by the engagement of a projection 46 on the latter in a slot 47 in the disk 42. The disk 43 may be frictionally driven by a pulley 48 connected by a belt 49 to a pulley 50 of an auxiliary motor 51. This pulley 48 is freely mounted on the shaft 27 and is pressed laterally against the disk 43 by a spring 52 the pressure of which is also transmitted to two friction linings 53 and 54 gripped between the disks 43, 42 and 41.

The motor 51 is driven at a speed such that the pulley 48 turns slightly less quickly than the shaft 27 when the speed of projection is normal, that is to say, in the present case, equal to 18 frames per second. Referring to FIG. 8, the disk 41 is driven in a clockwise direction and, as a result of the friction exerted by the pulley 48, which tends to prevent the disks 42 and 43 from rotating as quickly as the disk 41, the disks 42 and 43 rotate relatively to the disk 41 until their projections 44 and 46 abut against the end of the slots 45 and 47 respectively. In this position, the blades of the three disks are superposed, so that the shutter has only three operative blades.

When the speed of the shaft 27 falls to a speed of projection of 5 frames per second, the pulley 48 is driven by the motor 51 at a speed higher than that of said shaft 27, so that this pulley frictionally drives the disks 42 and 43 to bring them into the position shown in FIG. 8, so that the shutter has nine operative blades.

FIGS. 10 and 11 show another embodiment of a shutter, the construction of which is very similar to that shown in FIGS. 8 and 9. This shutter also comprises three disks 41, 42 and 43 the mutual rotation of which is limited by projections 44 and 46 engaging in slots 45 and 47. In this embodiment, the disks 42 and 43 may rotate about the shaft 27 and the disk 43 carries an inertia head 55.

This inertia head resists the rotational drive of the disk 43 when the projector is started up, that is to say when the disk 41, which was at rest, is suddenly driven to rotate in a clockwise direction, referring to FIG. 10. As a result, upon starting up, the disks 42 and 43 rotate about the shaft 27 in order to take up the position in which their blades are located behind the blades of the disk 41. When one changes from the speed of 18 frames to the speed of 5 frames per second, the shutter is subjected to a sufficiently rapid slowing down and as a result of the inertia of the mass 55, the disks 43, and then 42 tend to continue their rotation at the same speed, thus making them pivot relative to the disk 41 in order to occupy the positions shown in FIG. 10.

During the projection at one or the other of the provided speeds, that is to say 18 and 5 frames per second, the speed of the shaft 27 remains constant, so that the shutter remains in the position which it has taken up. However, in order to eliminate completely any risk of an inopportune change of the position of the shutter during the projection, it is desirable to provide for a slight friction of the disks 42 and 43 either against the shaft 27, or between each other and with the disk 41. According to a modification, notches could also be provided to hold the shutter in each of the two operative positions which it may occupy.

It is obvious that the control of the number of shutter blades which are to be operative could be effected not by centrifugal action but, for example, by a mechanical connection between the control knob 10 and the shutter.

I claim:

A cinematographic projector, adapted to be selectively driven at at least two different speeds, comprising, a film feeding mechanism having a shutter with a variable number of blades, said shutter provided with three equispaced fixed blades and six movable blades, an electric motor driving said mechanism, an objective lens, a projection lamp, said shutter being arranged for cutting off the light beam emitted by said lamp and directed towards said objective lens, a control device for regulating the speed of said mechanism, means for varying the number of operative blades of said shutter, said control device adapted to select at least one of said two different speeds, the first of said speeds being a normal projection speed whereby said shutter presents said three fixed blades and the second speed being at least twice slower than said normal speed wherein said shutter presents, in addition to said three fixed blades, said six movable blades, and said means for varying the number of blades from three to nine being responsive to the selected projection speed in order to avoid flicker.

References Cited in the file of this patent

UNITED STATES PATENTS

| | | |
|---|---|---|
| 1,245,755 | Mehlfelder | Nov. 6, 1917 |
| 2,190,658 | Githens et al. | Feb. 20, 1940 |
| 2,349,500 | Howell | May 23, 1944 |
| 2,513,702 | Andrews | July 4, 1950 |
| 2,609,725 | Isom et al. | Sept. 9, 1952 |